United States Patent
Maknickas et al.

(10) Patent No.: US 11,916,937 B2
(45) Date of Patent: *Feb. 27, 2024

(54) SYSTEM AND METHOD FOR INFORMATION GAIN FOR MALWARE DETECTION

(71) Applicant: UAB 360 IT, Vilnius (LT)

(72) Inventors: Vykintas Maknickas, Vilnius (LT); Mantas Briliauskas, Vilnius (LT); Dainius Razinskas, Vilnius (LT)

(73) Assignee: UAB 360 IT, Vilnius (LT)

( * ) Notice: Subject to any disclaimer, the term of this patent is extended or adjusted under 35 U.S.C. 154(b) by 0 days.

This patent is subject to a terminal disclaimer.

(21) Appl. No.: 17/985,948

(22) Filed: Nov. 14, 2022

(65) Prior Publication Data

US 2023/0254326 A1     Aug. 10, 2023

Related U.S. Application Data

(63) Continuation of application No. 17/666,944, filed on Feb. 8, 2022, now Pat. No. 11,522,885.

(51) Int. Cl.
*H04L 9/40* (2022.01)
*G06N 20/00* (2019.01)

(52) U.S. Cl.
CPC ......... *H04L 63/1416* (2013.01); *G06N 20/00* (2019.01)

(58) Field of Classification Search
CPC ............................ H04L 63/1416; G06N 20/00
USPC .......................................................... 726/23
See application file for complete search history.

(56) References Cited

U.S. PATENT DOCUMENTS

| | | | | |
|---|---|---|---|---|
| 9,665,713 B2* | 5/2017 | Avasarala | ............... | G06F 21/56 |
| 9,721,097 B1* | 8/2017 | Davis | ................... | G06N 3/0454 |
| 10,162,967 B1* | 12/2018 | Oliver | ................... | G06F 21/565 |
| 10,885,188 B1* | 1/2021 | Batur | .................... | G06F 21/565 |
| 11,182,481 B1* | 11/2021 | Oliver | .................... | G06N 20/00 |
| 11,188,650 B2* | 11/2021 | Davis | ................... | G06N 20/00 |
| 2009/0300761 A1* | 12/2009 | Park | ...................... | G06F 21/562 |
| | | | | 707/999.102 |
| 2015/0089647 A1* | 3/2015 | Palumbo | ................. | G06F 21/53 |
| | | | | 726/23 |
| 2017/0262633 A1* | 9/2017 | Miserendino | ........ | G06K 9/6256 |
| 2019/0081983 A1* | 3/2019 | Teal | ...................... | H04L 43/045 |
| 2019/0149564 A1* | 5/2019 | McLean | .............. | H04L 63/1433 |
| | | | | 713/171 |
| 2019/0236490 A1* | 8/2019 | Harang | .................. | G06N 20/00 |
| 2020/0021620 A1* | 1/2020 | Purathepparambil | ....................... | H04L 63/102 |
| 2020/0042701 A1* | 2/2020 | Yang | ...................... | G06N 3/045 |
| 2020/0285737 A1* | 9/2020 | Kraus | ................... | G06F 21/552 |

(Continued)

*Primary Examiner* — Badri Narayanan Champakesan
(74) *Attorney, Agent, or Firm* — Moser Taboada

(57) ABSTRACT

Systems and methods for malware detection are provided herein. In some embodiments, a system having one or more processors is configured to: perform, on a plurality of user devices, at least one of a static analysis or a behavioral analysis of a file downloaded to a user device; receive a plurality of features extracted from the downloaded file; train at least one machine learning model, on a central server in communication with the plurality of user device, based on the plurality of features; distribute the at least one trained machine learning model to the plurality of user devices; and update at least one of a machine learning model used for the static analysis or behavioral analysis with the distributed at least one trained machine learning model.

14 Claims, 8 Drawing Sheets

(56) References Cited

U.S. PATENT DOCUMENTS

| | | | |
|---|---|---|---|
| 2020/0293655 A1* | 9/2020 | Long | G06F 21/602 |
| 2021/0241175 A1* | 8/2021 | Harang | G06N 20/20 |
| 2021/0250364 A1* | 8/2021 | Webster | G06F 17/18 |
| 2021/0286989 A1* | 9/2021 | Zhong | G06V 30/413 |
| 2021/0329127 A1* | 10/2021 | Singhal | G06N 20/00 |
| 2022/0037022 A1* | 2/2022 | Khanzada | G16H 50/20 |
| 2022/0046047 A1* | 2/2022 | Lewis | H04L 63/1433 |
| 2022/0067146 A1* | 3/2022 | Cai | G06F 21/566 |

\* cited by examiner

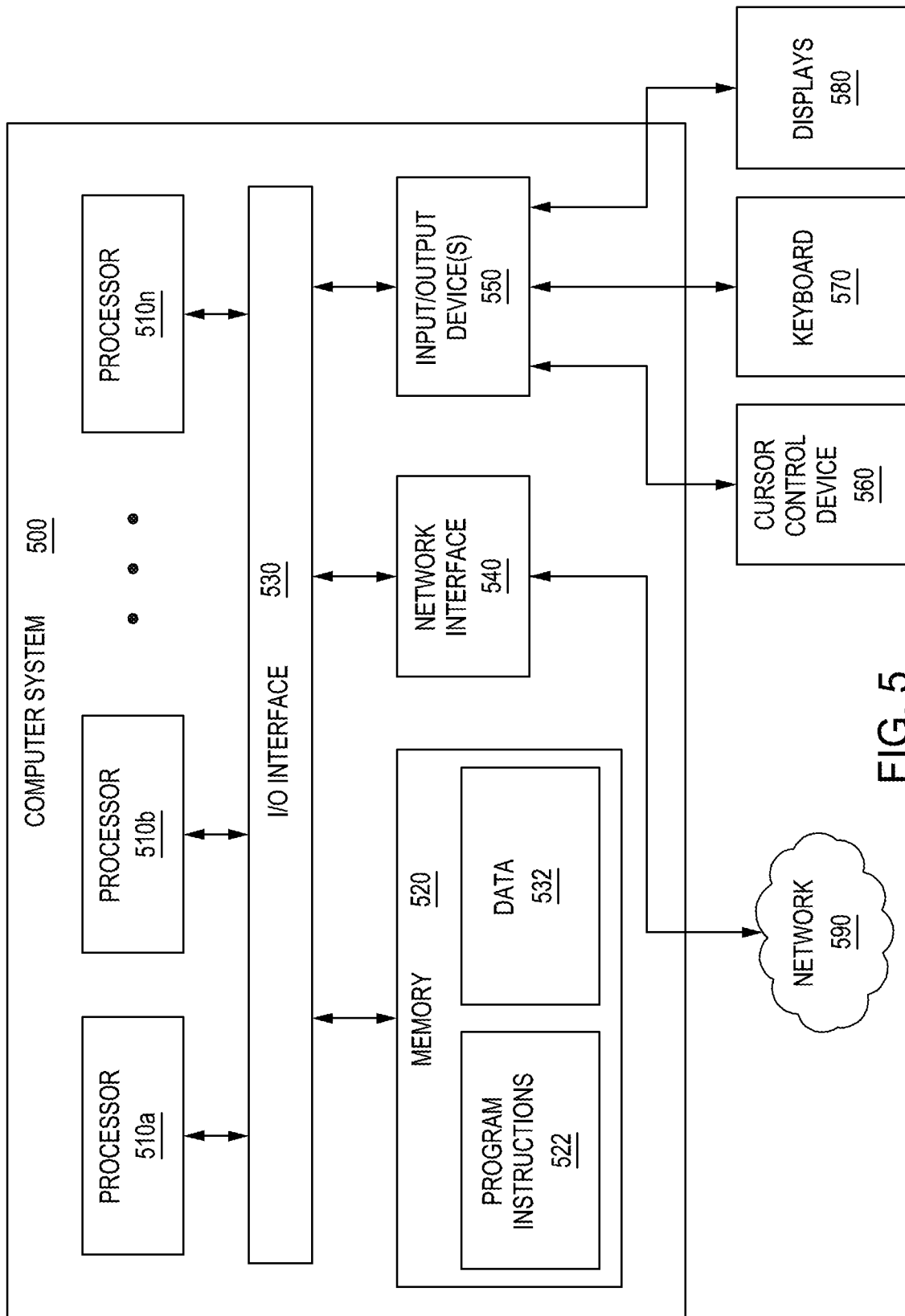

SYSTEM AND METHOD FOR INFORMATION GAIN FOR MALWARE DETECTION

CROSS-REFERENCE TO RELATED APPLICATIONS

This application is a continuation of co-pending U.S. patent application Ser. No. 17/666,944, filed Feb. 8, 2022, the entire contents of which are incorporated herein by reference.

FIELD

This disclosure relates generally to computer security, and more particularly to improving information gain and the training of machine learning models for malware detection while protecting the privacy of users and their files.

BACKGROUND

The traditional line of defense against malware is composed of malware detectors such as virus and spyware scanners. Static analysis is a process of analyzing a malware binary without actually running the code. Static analysis is generally performed by determining the signature of the binary file which is a unique identification for the binary file and can be done by calculating the cryptographic hash of the file and understanding each component.

Some malware detection systems use machine learning (ML) algorithms to detect malicious files. However, such ML algorithms usually require training on a centralized core infrastructure using many training files that must be stored and updated. Many of the training files are files obtained from users who download the files, which can raise privacy concerns for users.

Therefore, there is a need for improved methods and apparatuses for improving information gain and the training of machine learning models for malware detection while protecting the privacy of users and their files.

SUMMARY

Systems and methods for malware filtering are provided herein. In some embodiments, a system having one or more processors is configured to: perform, on a plurality of user devices, at least one of a static analysis or a behavioral analysis of a file downloaded to a user device; receive a plurality of features extracted from the downloaded file; train at least one machine learning model, on a central server in communication with the plurality of user device, based on the plurality of features; distribute the at least one trained machine learning model to the plurality of user devices; and update at least one of a machine learning model used for the static analysis or behavioral analysis with the distributed at least one trained machine learning model.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

FIG. 5 depicts a high-level block diagram of a computing device suitable for use with embodiments for efficient malware scanning of downloaded file in accordance with the present principles.

Figure 1:
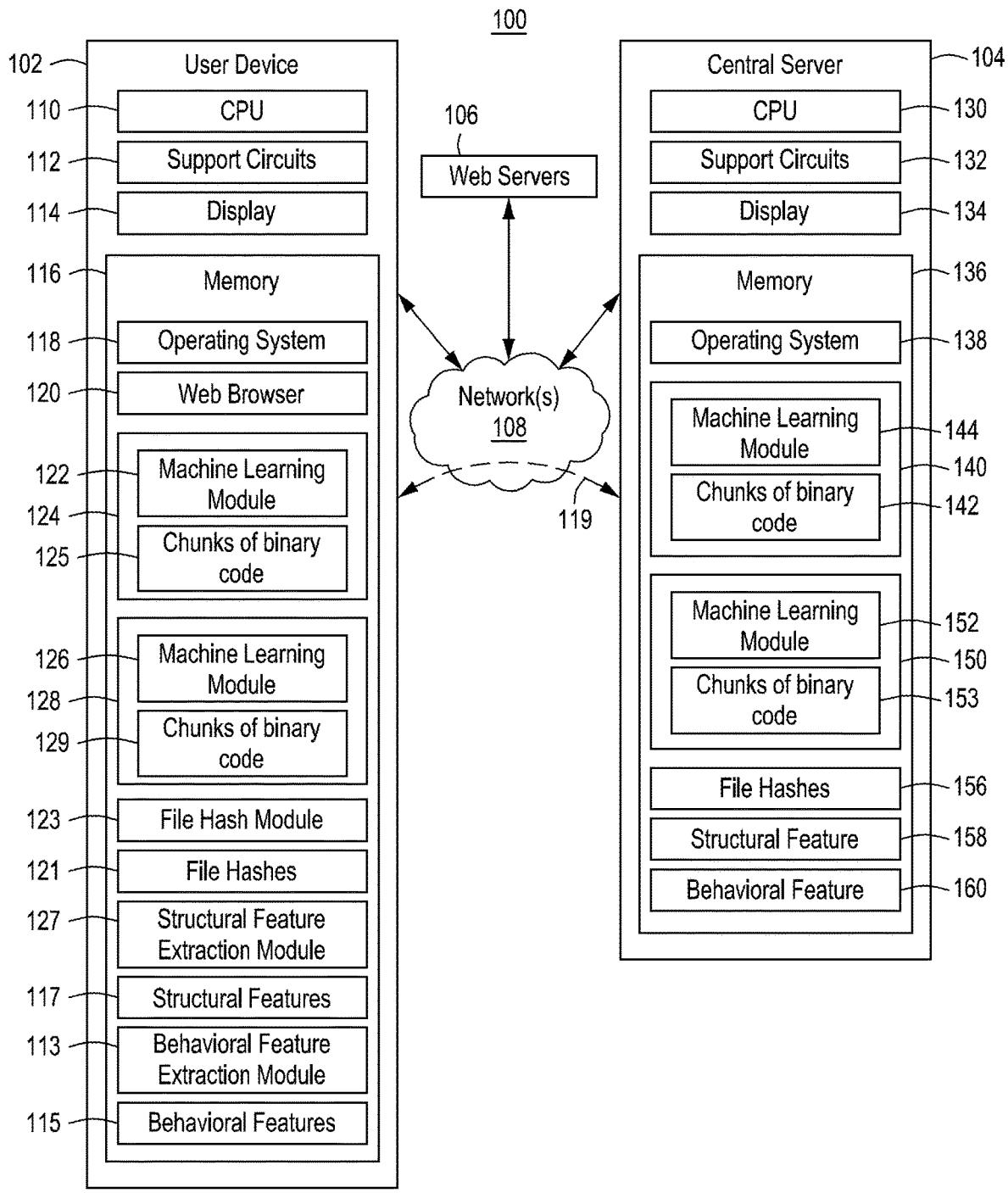
FIG. 1 depicts a high-level block diagram of a network architecture of a system for malware scanning in accordance with an embodiment of the present principles.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

The following detailed description describes techniques (e.g., methods, processes, and systems) for improving information gain and the training of machine learning models for malware detection while protecting the privacy of users and their files. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims.

Embodiments consistent with the disclosure use a solution that works with downloaded files from the Internet, which can include malicious content. Malicious files may include content (i.e., code) that a user would deem unimportant and/or would cause harm to their user device (e.g., malware, viruses, etc.).

Systems and methods in accordance with this disclosure can perform a static analysis of a file on edge devices, such as user devices (e.g., personal computers) and such analyses can be used to feed training data to centralized server to train a centralized machine learning algorithm that can be distributed to all of the edge devices. The edge devices can break a downloaded file and analyze discrete chunks of code of the file to identify whether the file contains any hidden malware. By performing the analysis on chunks, the system is able to efficiently identify features or signatures of the chunks that are indicative of malicious code, which may have been added by hackers/bad actors. In some embodiments, structural features can be extracted from the chunks and a hash of the file can be made and sent to the core to check for the malware in the existing malware databases and to train the centralized machine learning algorithm. Thus, the entire file does not have to be sent to train the centralized machine learning algorithm, thereby preserving privacy for the user. The trained centralized machine learning algorithm can then be used to update all user devices.

In some embodiments, systems and methods in accordance with this disclosure can further perform a behavioral analysis of a downloaded file on edge devices and such analyses can be used to feed training data to a centralized server to train a centralized machine learning algorithm that can be distributed to all of the edge devices. In some embodiments, a system in accordance with this disclosure can perform a behavior analysis of a downloaded file by breaking the code into discrete chunks and running the downloaded file on an isolated virtual machine (otherwise known as a "protected sandbox") to correlate or map each chunk with an observed behavior of the code on the virtual machine during execution of the downloaded file. In this way, certain chunks can be classified based on their anticipated behaviors, which may be malicious. The behaviors may match known behaviors of chunks of data that are known to be part of malicious files. Thus, it may be determined that downloaded files having chunks of data corresponding to classified behaviors are malicious.

Also, in some embodiments, a user device may send a hash of the file, structural features of the file, and the behavioral features to a central server, which may use the hash, structural features, and behavioral features to check for the malware in the existing malware databases and return a malicious/non-malicious label to the user device for updating and training a machine learning algorithm used by the user device. In some embodiments, the local machine learning model on the user device does not provide labels to the machine learning model on the external server. In such embodiments, the only labels that should be trusted are the labels from existing external malware databases that are used to check for corresponding hashes and structural features.

Thus, systems, apparatuses, and methods consistent with embodiments of this present disclosure detect malicious files using machine learning while protecting a user's privacy. Such detected malicious files may be handled according to various rules, e.g., allow the execution of the file, block the execution of the file, report the file as malicious, allow the execution of the file only upon user authorization, etc. Details of such systems, apparatuses and methods are described in detail below with respect to the figures.

FIG. 1 depicts a block diagram of a Malware Scanning and Filtering system 100 in accordance with at least one embodiment of the disclosure. The system 100 includes a plurality of user devices 102 (one is shown in FIG. 1), a centralized server 104, and a plurality of web servers 106 (one is shown in FIG. 1) communicatively coupled via one or more networks 108. In embodiments, the centralized server 104 is configured to communicate with the user device 102 via networks 108 as discussed in greater detail below.

The networks 108 comprise one or more communication systems that connect computers by wire, cable, fiber optic, and/or wireless link facilitated by various types of well-known network elements, such as hubs, switches, routers, and the like. The networks 108 may include an Internet Protocol (IP) network, a public switched telephone network (PSTN), or other mobile communication networks, and may employ various well-known protocols to communicate information amongst the network resources.

The end-user device or edge device (also referred throughout as "user device") 102 comprises a Central Processing Unit (CPU) 110, support circuits 112, display device 114, and memory 116. The CPU 110 may comprise one or more commercially available microprocessors or microcontrollers that facilitate data processing and storage. The various support circuits 112 facilitate the operation of the CPU 110 and include one or more clock circuits, power supplies, cache, input/output circuits, and the like. The memory 116 comprises at least one of Read Only Memory (ROM), Random Access Memory (RAM), disk drive storage, optical storage, removable storage and/or the like. In some embodiments, the memory 116 comprises an operating system 118, web browser 120, a file verification module 124 having a machine learning module 122, and a behavior analysis module 128 having a machine learning module 126, a file hash module 123, file hashes 121, a structural feature extraction module 127, structural features 117, a behavioral feature extraction module 113, and behavioral features. The file hashes 121, the structural features 117, and the behavioral features 115 may be included in the form of a database, file, or other storage structure. In some embodiments a file verification module 124 may also include chunks of binary code 125 in the form of a database, file, or other storage structure. Similarly, the behavior analysis module 128 may also include chunks of binary code 129 in the form of a database, file, or other storage structure.

The centralized server 104 comprises a Central Processing Unit (CPU) 130, support circuits 132, display device 134, and memory 136. The CPU 130 may comprise one or more commercially available microprocessors or microcontrollers that facilitate data processing and storage. The various support circuits 132 facilitate the operation of the CPU 130 and include one or more clock circuits, power supplies, cache, input/output circuits, and the like. The memory 136 comprises at least one of Read Only Memory (ROM), Random Access Memory (RAM), disk drive storage, optical storage, removable storage and/or the like. In some embodiments, the memory 136 comprises an operating system 138. In some embodiments, the memory 136 includes a file verification module 140. In some embodiments, the memory 136 includes a behavior analysis module 150. The file verification module 140 may include chunks of binary code 142 in the form of a database, file, or other storage structure, and a machine learning module 144. The behavior analysis module 150 may include chunks of binary code 153 in the form of a database, file, or other storage structure, and a machine learning module 152. The file verification module 140 and the machine learning module 144 may have the same functionality as the file verification module 124 and machine learning module 122, respectively. Also, the behavior analysis module 128 and the machine learning module 126 may have the same functionality as the behavior analysis module 150 and the machine learning module 152. In some embodiments, the memory 136 includes file hashes of files that are known to be malicious. Also, in embodiments, the memory 136 includes structural features 158 generated from one or more user devices 102 and stored for training a machine learning algorithm used by the machine learning module 144. Also, in embodiments, the memory 136 includes behavioral features 160 generated from one or more user devices 102 and stored for training a machine learning algorithm used by the machine learning module 152.

The operating system (OS) 118 generally manages various computer resources (e.g., network resources, file processors, and/or the like). The operating system 118 is configured to execute operations on one or more hardware and/or software modules, such as Network Interface Cards (NICs), hard disks, virtualization layers, firewalls and/or the like. Examples of the operating system 118 may include, but are not limited to, various versions of LINUX, MAC OSX, BSD, UNIX, MICROSOFT WINDOWS, IOS, ANDROID and the like.

The web browser 120 is a well know application for accessing and displaying web page content. Such browsers include, but are not limited to, Safari®, Chrome®, Explorer®, Firefox®, etc. The file verification module 124, the behavior analysis module 128, the file hash module 123, the structural feature extraction module 127, and the behavioral feature extraction module 115 may be applications that may be run by the web browser 120 or the operating system 118.

In some embodiments, the file verification module 124 and/or the behavior analysis module 128 is a transparent security/antimalware service that runs on the user device 102 in the background. In embodiments, for every file downloaded by the web browser 120 or the operating system 118, the file verification module 124 on the user device 102 may perform a static analysis of the file to determine whether the file is malicious. For example, the file verification module 124 may break or otherwise separate the binary code of the downloaded file into chunks of binary code 125.

The file verification module 124 may employ the machine learning module 122 to calculate information gain and/or mutual information for each chunk 125. As used herein, information gain is a measure of the reduction in entropy or surprise from transforming a dataset in some way. It is commonly used in machine learning in the construction of decision trees from a training dataset, by evaluating the information gain for each variable, and selecting the variable that maximizes the information gain, which in turn minimizes the entropy and best splits the dataset into groups for effective classification. Information gain can also be used for feature selection, by evaluating the gain of each variable in the context of the target variable. In this slightly different usage, the calculation is referred to as mutual information between the two random variables. As used herein, information gain related to the analysis of each chunk refers to the predefined algorithm (e.g. C4.5, C5.0/See5, ID.3) of code chunks evaluation. When applied, the algorithm provides most information about maliciousness or cleanliness of the downloaded file. Having that information, the most informative code chunks are selected as ML features, and then used in the preprocessing stage.

Also, the file verification module 124 may employ the machine learning module 122 to score the chunks 125 based on the number of occurrences of the chunks in a file. From the scores assigned to the chunks 125, the machine learning module 122 may use a machine learning model or algorithm to predict whether the file associated with the chunks 125 is malicious. The prediction may be expressed as a probability of the downloaded file being malicious.

A prediction threshold probability may be used to make a final determination of the maliciousness of the downloaded file based on the predicted probability of the maliciousness of the downloaded file. For example, if the predicted probability that the downloaded file is malicious is greater than a predetermined threshold probability, the machine learning module 122 may determine that the file is malicious. Otherwise, if the calculated probability is at or below the predetermined threshold probability, the machine learning module 122 may determine that the file is not malicious. The predicted probability of maliciousness can be determined via two or more thresholds (e.g., low, medium, high probability). With score 0-25% a file could be named as "non-malicious", 26-75% "potentially malicious", 76-100% "malicious". The threshold may be adjusted by the service provider. If the file is malicious, the user device 102 may take actions according to various rules, e.g., allow the execution of the file, block the execution of the file, report the file as malicious, allow the execution of the file only upon user authorization, etc.

In some embodiments, the file verification module 124 may store files determined by to be malicious, and/or chunks 125 of binary code from those malicious files to a database, file, or other storage structure accessible to the user device 102.

Also, the file hash module 123 may calculate a hash 121 of the downloaded file, and the feature extraction module 127 may extract structural features 117 from the downloaded file or the chunks 125. The hashes 121 and structural features 117 may be stored in memory 116 and they may be sent from the user device 102 to the centralized server 104 to check for the malware in the existing malware databases and to train a machine learning algorithm of the machine learning module 152. In some embodiments, the hashes 121 and the structural features 117 may be sent in real time to the central server 104 as the downloaded file verification process by the file verification module 124 is occurring. In other embodiments, the hashes 121 and structural features 117 may be stored for a certain period of time and sent to the central server 104 periodically (e.g., every 24 hours). The hashes 121 and structural features 117 may be deleted from the memory 116 after they are sent to the central server 104.

In some embodiments, the extracted structural features 117 may include the number of times a chunk included in the database 125 is repeated in the downloaded file. Thus, for example, if a certain chunk of binary code repeats three times in the file, the count associated with the chunk would be three. The amount of repetition of a chunk in a binary file may be an indication that the binary file, and thus the downloaded file, with that chunk is more likely to be malicious. In embodiments, the extracted structural features 117 may relate to the overall structure of the downloaded file and/or the structure of each chunk included in the database 125. For example, in the case of a Microsoft Windows Portable Executable (PE) formatted file, portions of or the entire header of the downloaded file may be a feature.

The Portable Executable (PE) format is a file format for executables, object code, DLLs and others used in 32-bit and 64-bit versions of Windows operating systems. The PE format is a data structure that encapsulates the information necessary for the Windows OS loader to manage the wrapped executable code. This includes dynamic library references for linking, API export and import tables, resource management data and thread-local storage (TLS) data. On NT operating systems, the PE format is used for EXE, DLL, SYS (device driver), MUI and other file types. The Unified Extensible Firmware Interface (UEFI) specification states that PE is the standard executable format in EFI environments. A PE file consists of a number of headers and sections that tell the dynamic linker how to map the file into memory. An executable image consists of several different regions, each of which require different memory protection; so the start of each section must be aligned to a page boundary. For instance, typically the .text section (which holds program code) is mapped as execute/read only, and the .data section (holding global variables) is mapped as no-execute/read write. However, to avoid wasting space, the different sections are not page aligned on disk. Part of the job of the dynamic linker is to map each section to memory individually and assign the correct permissions to the resulting regions, according to the instructions found in the headers. Thus, in view of the use of headers in PE files, header information may be useful for training the ML algorithm of the ML module 152.

Another example of header information used as features is in the case of Executable and Linkable Format (ELF, formerly named Extensible Linking Format) file format. ELF is a common standard file format for executable files, object code, shared libraries, and core dumps. Each ELF file is made up of one ELF header, followed by file data. The data can include: Program header table, describing zero or more memory segments; Section header table, describing zero or more sections; and Data referred to by entries in the program header table or section header table. The segments contain information that is needed for run time execution of the file, while sections contain important data for linking and relocation. Any byte in the entire file can be owned by one section at most, and orphan bytes can occur which are unowned by any section. The ELF header defines whether to use 32- or 64-bit addresses. The header contains three fields that are affected by this setting and offset other fields that follow them. The ELF header is 52 or 64 bytes long for 32-bit and 64-bit binaries respectively. The program header table tells the system how to create a process image. It is found at file offset e_phoff, and consists of e_phnum entries, each with size e_phentsize. The layout is slightly different in 32-bit ELF vs 64-bit ELF, because the p_flags are in a different structure location for alignment reasons. Thus, in view of the use of headers in PE files, header information may be useful for training the ML algorithm of the ML module 144 (or ML module 122).

The machine learning algorithm of the machine learning module 144 may be trained using hashes 121 and structural features 117 from multiple user devices 102. The trained machine learning algorithm may then be distributed to the multiple user devices 102 as an update to the machine learning modules 122 on the multiple user devices 102. Since some of the user devices 102 may be on or off at different times, each user device 102 may be updated at different times depending on when they are on and ready to receive the updated machine learning algorithm from the central server 104. Thus, the machine learning algorithms being used in the machine learning modules 122 on a plurality of user devices 102 can be updated based on malware detection occurring on other user devices 102 in the system 100 and without sending each downloaded file to the central server 104 for analysis. At least one benefit of this is that user privacy is preserved. Another benefit of this is that the central server 104 does not require large storage space to store large numbers of user-downloaded files.

The user device 102 may also include the behavior analysis module 128 configured to perform a behavior (dynamic) analysis on a downloaded executable file. For example, the behavior analysis module 128 may break or otherwise separate the binary code of the downloaded file into discrete chunks 129 of binary code. The behavior analysis module 128 may execute the downloaded file in a protected sandbox or virtual machine on the user device 102 to trace the execution of the chunks 129. As the code is being executed, the behavior analysis module 128 can correlate or map the actions or behaviors taking place in the protected sandbox or virtual machine to a corresponding chunk 129 of code in the file being executed. The behavior analysis module 128 may use the machine learning module 126 to classify or otherwise label the chunks 129 of code according to their corresponding behavior. The machine learning module 126 may include a machine learning model that may be applied to the classified chunks 129 to predict whether the downloaded file having the classified chunks 129 is malicious. Based on the prediction, which may be expressed as a probability or likelihood that the downloaded file is malicious, a determination can be made by the behavior analysis module 128 about whether the downloaded file is malicious. If the behavior analysis module 128 determines the file is malicious, the behavior analysis module 128 may take action according to various rules, e.g., allow the execution of the file, block the execution of the file, report the file as malicious, allow the execution of the file only upon user authorization, etc.

Also, the behavioral feature extraction module 113 may, using information that is mapped with the chunks 129, extract behavioral features 115 from the chunks 129 during the above-noted execution of the file on the virtual machine, which can be used to train the machine learning algorithm of machine learning module 152. The behavioral features 115 may include kernel API calls that are made during execution of the downloaded executable file (a.k.a. application program), as well as any actions the application program is taking such as requesting other files, and requests for access to network connections or communication ports of the user device 102.

The user device 102 may send the behavioral features 115 to the central server 104 to train the machine learning algorithm of the machine learning module 152. This may be performed by multiple user devices 102 periodically, such as every 24 hours or every week. The trained machine learning algorithm of the machine learning module 152 may then be distributed to the multiple user devices 102 to update their machine learning algorithms used in the machine learning module 126 of the user devices 102. Such update can be done periodically, such as every 24 hours or every week. Because some of the user devices 102 may be on or off at different times, each user device 102 may be updated at different times.

In other embodiments, hashes 121 and behavioral features 115 are sent from the user device 102 to the central server 104 for processing. Specifically, the behavioral analysis module 150 on the central server 104 may use the hashes and the behavioral features to determine whether the downloaded file associated with the hashes 121 and behavioral features 115 is malicious. Once the central server 104 determines the maliciousness of the downloaded file, the central server 104 may generate an associated label of maliciousness of the downloaded file and send the label to the user device 102 to help update and train a machine learning algorithm of a machine learning module 126 on the user device 102. In other words, the machine learning module 126 will be updated to associate the behavioral features 115 as being malicious when scanning future downloaded files. Feeding of the hashes 121 and the behavioral features 115 from multiple user devices 102 to the central server 104 can be used to train and improve the machine learning algorithm used on the central server 104. In this way, federated learning by the user devices 102 may be accomplished without transmitting the entire downloaded file to the central server 104 while preserving privacy of users.

In operation, in some embodiments as described above, when a user device 102 downloads a file from the Internet, the transparent file verification module 124 running on the user device 102 may perform a static analysis file verification process on the user device 102. The file verification module 124 may process the file verification request by predicting whether or not the file is malicious based on machine learning algorithms and trained models it has created/stored based on previous analysis and verification of known malicious files.

The file verification module 140 of the centralized server 104 may break the binary code of the downloaded file into discrete chunks of binary code 142. The file verification module 140 may employ the machine learning module 144 to calculate information gain for each chunk 142. As used herein, information gain is a measure of the reduction in entropy or surprise from transforming a dataset in some way. It is commonly used in machine learning in the construction of decision trees from a training dataset, by evaluating the information gain for each variable, and selecting the variable that maximizes the information gain, which in turn minimizes the entropy and best splits the dataset into groups for effective classification. Information gain can also be used for feature selection, by evaluating the gain of each variable in the context of the target variable. In this slightly different usage, the calculation is referred to as mutual information between the two random variables. As used herein, information gain related to the analysis of each chunk refers to the predefined algorithm (e.g., C4.5, C5.0/See5, ID.3) of code chunks evaluation. When applied, the algorithm provides most information about maliciousness or cleanliness of the downloaded file. Having that information, the most informative code chunks are selected as ML features, and then used in the preprocessing stage. Also, the machine learning module 144 may score the chunks 142 based on their number of occurrences in a file. From the scores assigned to the chunks 142, the machine learning module 144 may use a machine learning model or algorithm to predict whether the file associated with the chunks 142 is malicious. The prediction may be expressed as a probability of the downloaded file being malicious.

A prediction threshold probability may be used to make a final determination of the maliciousness of the downloaded file based on the predicted probability of the maliciousness of the downloaded file. For example, if the predicted probability that the downloaded file is malicious is greater than a predetermined threshold probability, the machine learning module 144 may determine that the file is malicious. Otherwise, if the calculated probability is at or below the predetermined threshold probability, the machine learning module 144 may determine that the file is not malicious. The predicted probability of maliciousness can be determined via two or more thresholds (e.g., low, medium, high probability). With score of 0-25% a file may be named as "non-malicious", with a score of 26-75% a file may be named as "potentially malicious", and with a score of 76-100% a file may be named "malicious". The threshold may be adjusted by a service provider.

Also, the file hash module 123 may calculate a hash 121 of the downloaded file and send the hash 121 to the central server 104 for comparison to stored file hashes 156 of known malicious files. If the hash 121 matches a hash 156 of a known malicious file, then the user may be notified to act according to anti-malware rules and the machine learning module 144 may use the chunks 125 and the extracted structural features 117 to predict whether the downloaded file is malicious. The predictions of the machine learning module 144 may then update the machine learning algorithm of the machine learning module 144, which may in turn be used to update the machine learning algorithms of the machine learning modules 122 of the user devices 102. Otherwise, if the hash 121 does not match a hash 156 of a known malicious file, the machine learning module stores the hash 121 and notes the discrepancy and that further analysis of the downloaded file is needed. Over time, the unmatched hashes 121 may be continually compared against the stored file hashes 156 so that when a match occurs, the machine learning model on the central server 104 can be updated as discussed above. Optionally, if the hash 121 matches a hash 156 of a known malicious file, then the machine learning module 144 may check that the label from the external databases also designates the hash of the file as malicious. If the label is malicious, then the central server 104 takes no further action to analyze the downloaded file. However, if the label is non-malicious, the machine learning module notes the discrepancy and that further analysis is needed.

In some embodiments as described above, when a user device 102 downloads an executable file from the Internet, the transparent behavior analysis module 128 running on the user device 102 may perform a behavior (dynamic) analysis process on the user device 102 to determine if the file is malicious. The behavioral analysis module 128 may predict whether the file is malicious based on machine learning algorithms and trained models it has created/stored based on previous behavior analysis of known malicious files.

The behavior analysis module 128 of the user device 102 may break the binary code of the downloaded file into discrete chunks of binary code 129. The user device 102 may employ the machine learning module 126 to run the downloaded executable file (a.k.a. application program) in a virtual machine or protected sandbox to observe behaviors occurring during execution of the file. As the executable file is executed, the machine learning module 126 may correlate behaviors occurring in the virtual machine to the corresponding chunks 126 of data being run. The machine learning module 126 may also classify the chunks 129 based on their observed behavior. Based on the classification of the chunks 129, the machine learning module 126 may score the chunks 129 as more or less likely to be associated with a malicious file. From the scores assigned to the chunks 129, the machine learning module 126 may use a machine learning model or algorithm to predict whether the file associated with the chunks 129 is malicious. The prediction may be expressed as a probability of the downloaded file being malicious.

A prediction threshold probability may be used to make a final determination of the maliciousness of the downloaded file based on the predicted probability of the maliciousness of the downloaded file. For example, if the predicted probability that the downloaded file is malicious is greater than a predetermined threshold probability, the machine learning module 126 may determine that the file is malicious. Otherwise, if the calculated probability is at or below the predetermined threshold probability, the machine learning module 126 may determine that the file is not malicious. In another example, the predicted probability of maliciousness can be determined via two or more thresholds (e.g., low, medium, high probability). With score of 0-25% a file may be named as "non-malicious", with a score of 26-75% a file may be named as "potentially malicious", and with a score of 76-100% a file may be named "malicious". The threshold may be adjusted by a service provider.

The extracted behavioral features 115 are also sent with the label to the behavior analysis module 150 of the central server 104 for updating a machine learning algorithm used by the machine learning module 152. The centralized server 104 receives labels and extracted behaviors periodically (e.g., daily or weekly) from multiple user devices 102 in order to update the machine learning algorithm. Once the machine learning algorithm of the machine learning module 152 is updated, the centralized server 104 may distribute its machine learning algorithm as an update to the machine learning modules 126 of all of the user devices 102.

In some embodiments, the machine learning model or algorithms used by machine learning modules 122, 126, 144, and 152 may include a multi-layer neural network comprising nodes that are trained to have specific weights and biases. In some embodiments, the machine learning algorithm employs artificial intelligence techniques or machine learning techniques to determine malicious chunks of binary code. In some embodiments, in accordance with the present principles, suitable machine learning techniques can be applied to learn commonalities in malicious code chunks and for determining from the machine learning techniques at what level malicious code chunks can be canonicalized. In some embodiments, machine learning techniques that can be applied to learn commonalities in malicious code chunks can include, but are not limited to, regression methods, ensemble methods, or neural networks and deep learning such as 'Se2oSeq' Recurrent Neural Network (RNNs)/Long Short Term Memory (LSTM) networks, Convolution Neural Networks (CNNs), Encoders and/or Decoders (including Transformers), graph neural networks applied to the abstract syntax trees corresponding to the malicious URLs, and the like.

In some embodiments, the scores attributed to chunks 125, 129 of code are derived from an analysis of known malicious files. For example, the machine learning module 144 may train the machine learning model of the machine learning module 124 to derive scoring rules based on training data (e.g., binary code chunks) derived from known malicious files. Thus, the machine learning module 124 can employ known malicious files to train the machine learning model to generate the scoring rules.

For example, in embodiments, to train the machine learning model of the machine learning module 124, the user device 102 may retrieve downloaded files from a storage of known malicious files, and break apart the binary code into chunks 125, such as 5 or 8 bytes in size. The user device 102 may inspect the chunks 125 to identify features or signatures that can be used to classify or score the chunks 125 according to possible maliciousness of the chunk 125. For example, in embodiments, the user device 102 may calculate information gain for each of the chunks 125, which can then be scored based on the number of occurrences in the downloaded file.

In some embodiments, the file verification module 124 breaks the entire downloaded file into chunks and scores all of the chunks 125 of binary code corresponding to the downloaded file. In some embodiments, however, less than all of the chunks 125 may be scored. For example, in some embodiments, only chunks 125 exceeding a threshold information gain are scored and used in predicting whether the downloaded file is malicious. This may reduce the speed of file verification.

Also, in some embodiments, the behavior analysis module 128 may have a machine learning module 126 that trains a machine learning model based on training data (e.g., binary code chunks) derived from known malicious files that have been executed in a virtual machine or protected sandbox. For example, in embodiments, to train the machine learning model of the machine learning module 126, the user device 102 may retrieve executable files from a storage of known malicious files, decompile the known malicious executable files into binary code, and break apart the binary code into chunks 129, such as 5 or 8 bytes in size. The user device 102 may execute the downloaded file in the virtual machine or protected sandbox to observe the behavior of the virtual machine during execution of the file. Known malicious behaviors are correlated to the corresponding chunks 129 of code being executed. The chunks 129 and their behaviors can then be stored in a data storage and used for comparison by the machine learning model for analyzing chunks 129 of code of unknown downloaded files.

FIGS. 2A-4B illustrate example flow diagrams representing one or more of the processes as described herein. Each block of the flow diagram may represent a module of code to execute and/or combinations of hardware and/or software configured to perform one or more processes described herein. Though illustrated in a particular order, the following figures are not meant to be so limiting. Any number of blocks may proceed in any order (including being omitted) and/or substantially simultaneously (i.e., within technical tolerances of processors, etc.) to perform the operations described herein.

Figure 2A:
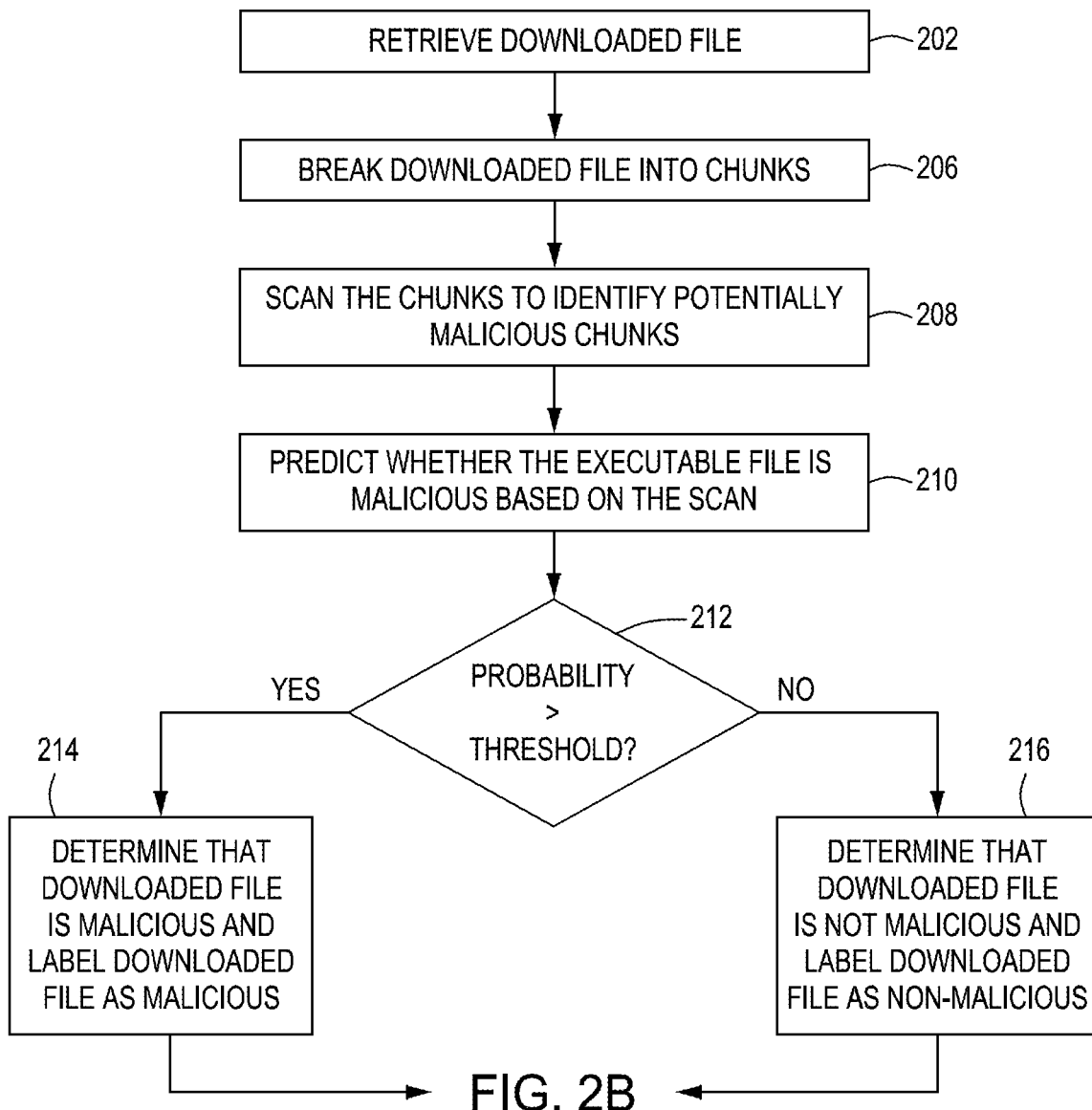
FIGS. 2A and 2B depict flow diagrams of a method for malware scanning, in accordance with an embodiment of the present principles.
Figure 2B:
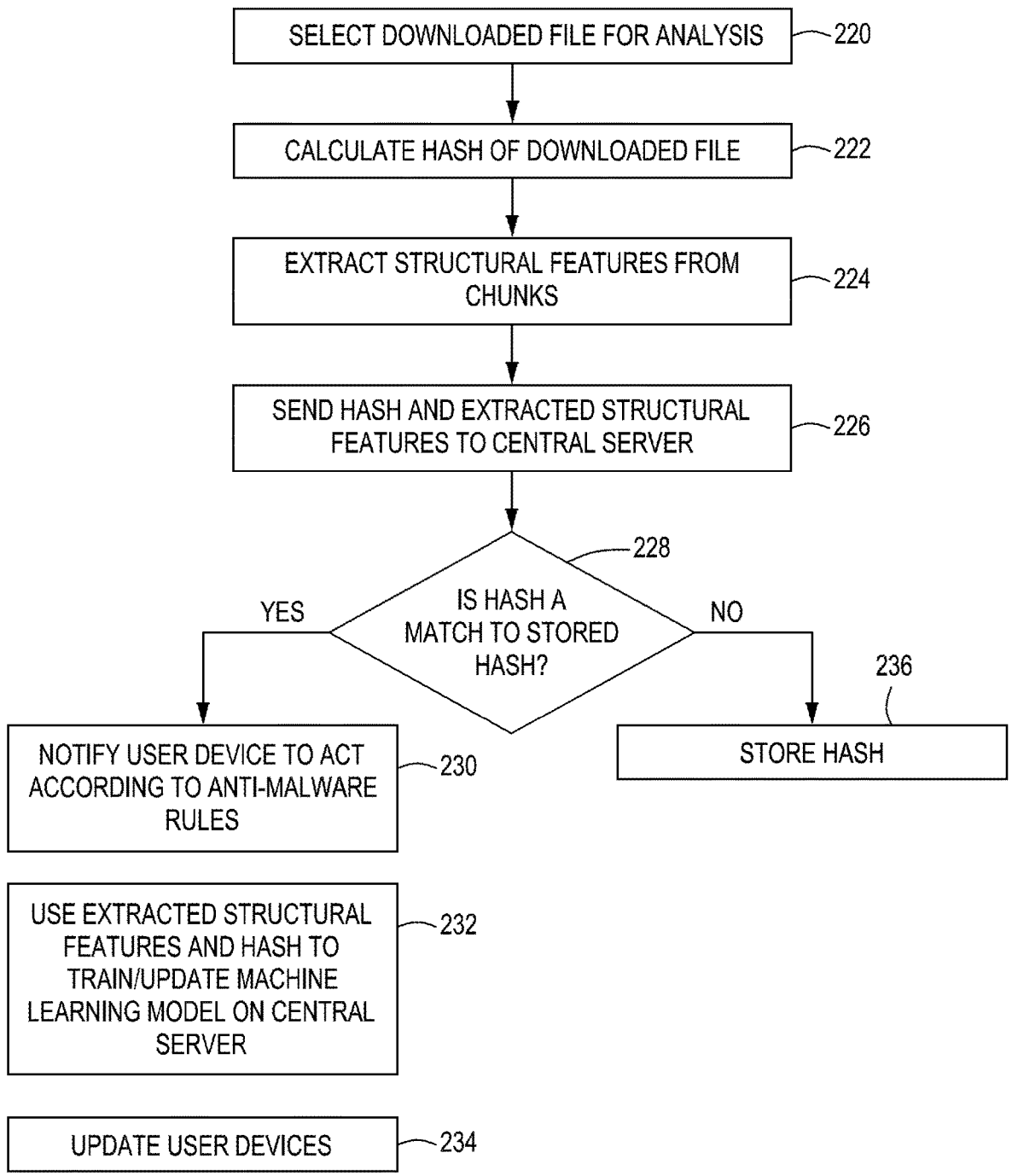

FIGS. 2A and 2B show a flow diagram of an example privacy-preserving, federated machine learning process 200 of malware scanning, in accordance with an embodiment of the present principles. Such a process 200 may begin at step 202 by retrieving a downloaded file. Such an downloaded file may have been downloaded from the Internet by the user device 102. Such a downloaded file may be processed by the file verification module 124. At step 206, the binary code is broken up into chunks 125. At step 206, the chunks 125 are scanned to identify potentially malicious chunks 125. For example, in embodiments, at step 206, the information gain is calculated for each chunk 125 and a machine learning model is applied to the chunks 125 to score the chunks 125 based on the information gain. The information gain may designate some of the chunks as "typical" for this file. Furthermore, the "typical" chunks may be preprocessed for the machine learning model for it to learn not from the complete set of chunks, but only from the "typical" ones. The scores attributed to the chunks 125 relate to the maliciousness of the chunk 125 based on the machine learning model. For example, the machine learning model may be trained using known malicious files and known non-malicious files, as described hereinabove. The known malicious files have been broken up into chunks which have been analyzed for features or signatures indicative of being more likely to be malicious than other chunks. Thus, when the machine model is applied to the chunks 125, the model is able to identify which chunks 125 are more likely to be malicious than others.

At step 210, based on the scoring applied to the chunks 125 in step 208, a prediction is made about whether the downloaded file is malicious. The prediction may be made by the machine learning model, which may calculate a probability that the downloaded file is malicious based on the scoring of the chunks 125. A probability threshold may be used to determine whether a downloaded file is malicious based on the prediction. For example, a rule may be established that a file would be determined to be malicious if the predicted probability of maliciousness exceeds the probability threshold (e.g., 50%) and would be determined to be non-malicious if the predicted probability was at or below the threshold. In another example, the predicted probability of maliciousness can be determined via two or more thresholds (e.g., low, medium, high probability). With a score 0-25% a file may be named as "non-malicious", with a score of 26-75% a file may be named as "potentially malicious", and with a score of 76-100% a file may be named "malicious". The threshold may be adjusted by a service provider. Thus, at step 212 a determination is made about whether the predicted probability of maliciousness is greater than the threshold. If the probability is greater than the threshold, then the downloaded file is determined to be malicious at step 214 and the file is labeled as malicious. Otherwise, if the probability is less than or equal to the threshold, the downloaded file is determined to be non-malicious at step 216 and the file is labeled as non-malicious. Based on the determination at steps 214 and 216, the user device 102 may take one of the above-mentioned actions according to various rules, e.g., allow the execution of the file, block the execution of the file, report the file as malicious, allow the execution of the file only upon user authorization, etc.

FIG. 2B shows additional steps of the method 200. At step 220, the downloaded file is selected for analysis and at step 222 the file hash module 123 calculates a hash 121 of the downloaded file. At step 224, the structural feature extraction module 127 extracts structural features 117 from the chunks 125, as discussed above. At step 226, the hash 121 and the extracted structural features 117 are sent to the central server 104 for analysis. At step 228 the hash 121 is compared to hashes 156 of known malicious files stored in memory 136 of the central server 104. If the hashes match (YES at step 228), then the user device 102 should receive a notification at step 230 for acting according to the various anti-malware-related rules, e.g., allow the execution of the file, block the execution of the file, report the file as malicious, allow the execution of the file only upon user authorization, etc. At step 232, the machine learning module 144 uses the hash 121 and the extracted structural features 117 to train and/or update the machine learning algorithm of the machine learning module 144 of the file verification module of the central server 104. The plurality of user devices 102 may then be updated at step 234 with the updated machine learning algorithm of the machine learning module 144. Also, if the hash 121 does not match any of the stored hashes 156 (NO at step 228), then the hash 121 is stored at step 236. For example, as the hashes 156 are updated over time, the hashes 121 stored at step 236 may be continually compared to the hashes 156, until a match with a hash 156 occurs, at which point the hash 121 and the structural features of the file associated with hash 121 can be used to train and update the machine learning model on the central server 104.

Figure 3A:
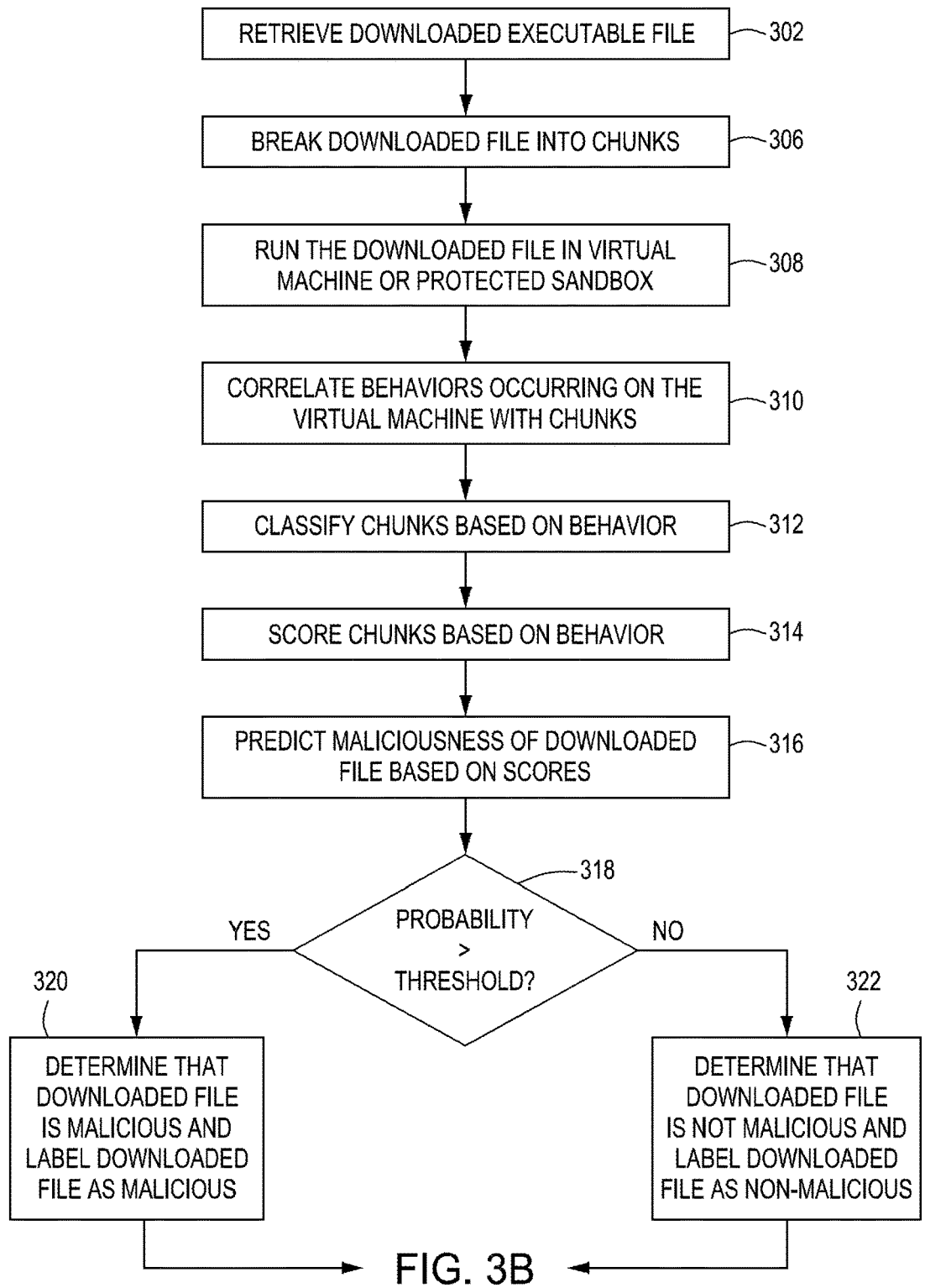
FIGS. 3A and 3B depict flow diagrams of a method for malware scanning, in accordance with an embodiment of the present principles.
Figure 3B:
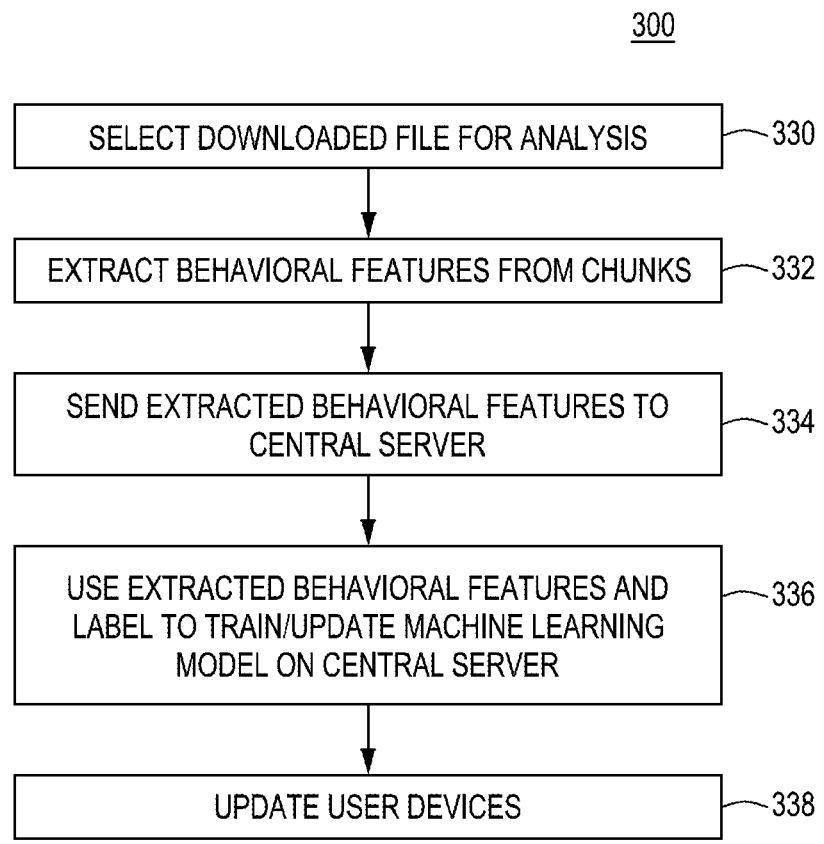

FIGS. 3A and 3B illustrate an example flow diagram representing a federated behavioral learning method 300 in accordance with the disclosure. The method 300 begins at step 302 by retrieving a downloaded executable file. At step 306, the binary file is broken into chunks 129. At step 308, the downloaded executable file is run in a virtual machine or protected sandbox to trace the execution of the chunks 129. At step 310, the behavior of the virtual machine or protected sandbox is correlated to the corresponding chunks 129 as the executable file is running. At step 312, each chunk 129 is classified or otherwise labeled based on the corresponding behavior observed. In this way, any chunks 129 exhibiting behaviors that are known to be associated with malicious files will be used to score the chunks 129 as more likely to be malicious at step 314. At step 316, a prediction of maliciousness of the downloaded executable file may be made based on the score of the chunks 129. Such a prediction may be performed by a machine learning model of the machine learning module 126 trained on known malicious files that have been run on virtual machines and whose binary code has been broken into chunks and analyzed for behaviors. At step 318, a determination is made about whether the downloaded executable file is malicious based on the prediction at step 316. The determination may be based on a probability threshold like that in step 212 of method 200. Thus, if the predicted probability of maliciousness of the downloaded executable file is above a threshold, then it is determined at step 320 that the downloaded executable file is malicious and the executable file is labeled as malicious, while if the predicted probability is at or below the threshold, then it is determined at step 322 that the executable file is non-malicious, and the executable file is labeled as non-malicious. Based on the label of the downloaded executable file as malicious or non-malicious, the user device 102 may take one of the above-mentioned actions according to various rules, e.g., allow the execution of the file, block the execution of the file, report the file as malicious, allow the execution of the file only upon user authorization, etc. Also, if the downloaded executable file is determined to be malicious, the user device 102 may use the web browser 120 to notify a user of the consequences of running the downloaded executable file in terms of the type of behaviors that may occur to the user device 102.

FIG. 3B shows additional steps of the method 300. At step 330, the downloaded executable file is selected for analysis and at step 332 the behavior feature extraction module 113 extracts behavioral features 115 of the chunks 129. At step 334, the extracted behavioral features 115 are sent to the central server 104 for analysis. At step 336 the machine learning module 152 uses the extracted behavioral features and the maliciousness label to train and/or update the machine learning algorithm used by the machine learning module 152 of the behavioral analysis module 150 of the central server 104. At step 338 the user devices 338 may be updated with the machine learning algorithm used by the machine learning module 152 of the central server 104.

Figure 4A:
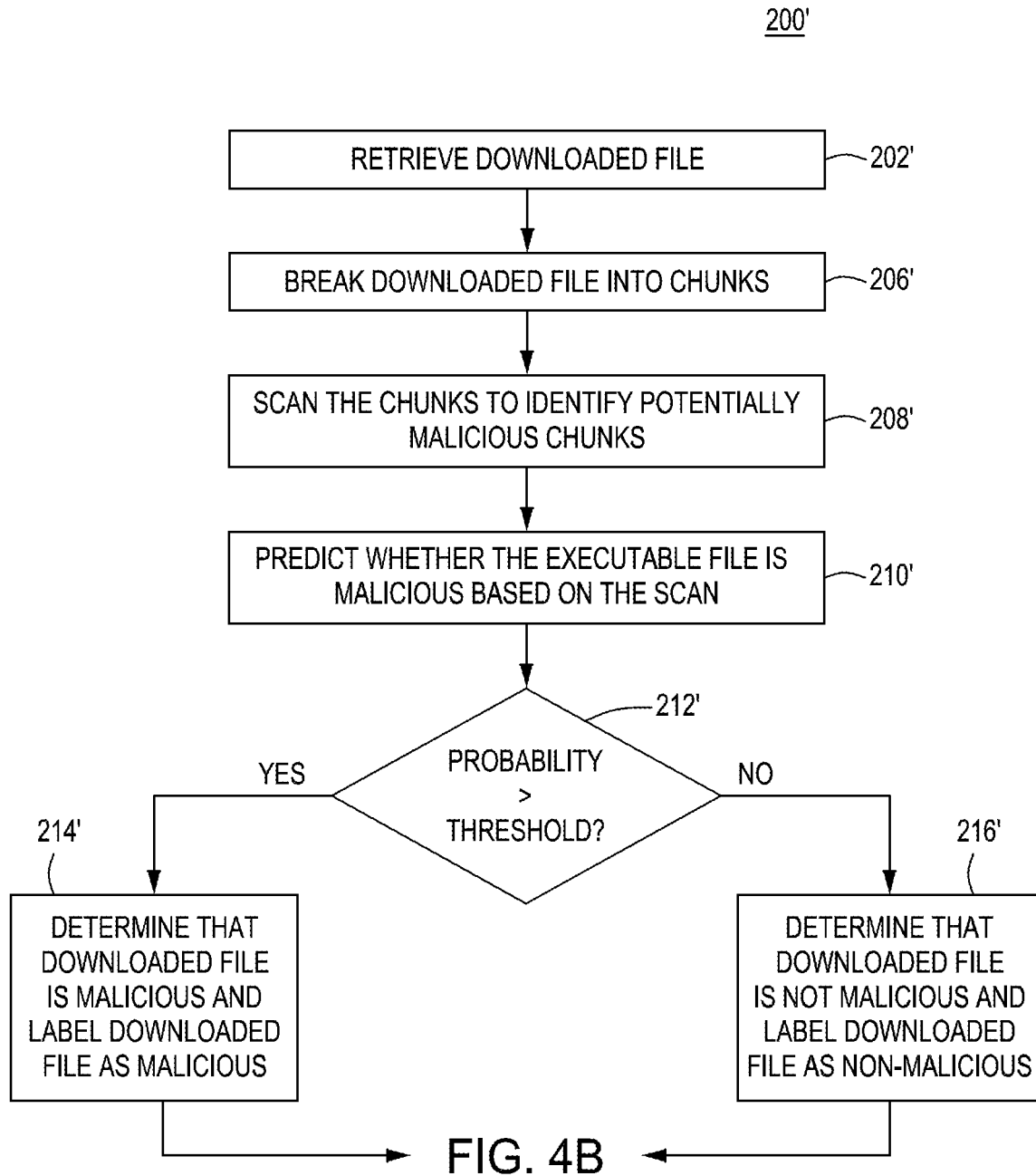
FIGS. 4A and 4B depict flow diagrams of a method for malware scanning, in accordance with an embodiment of the present principles.
Figure 4B:
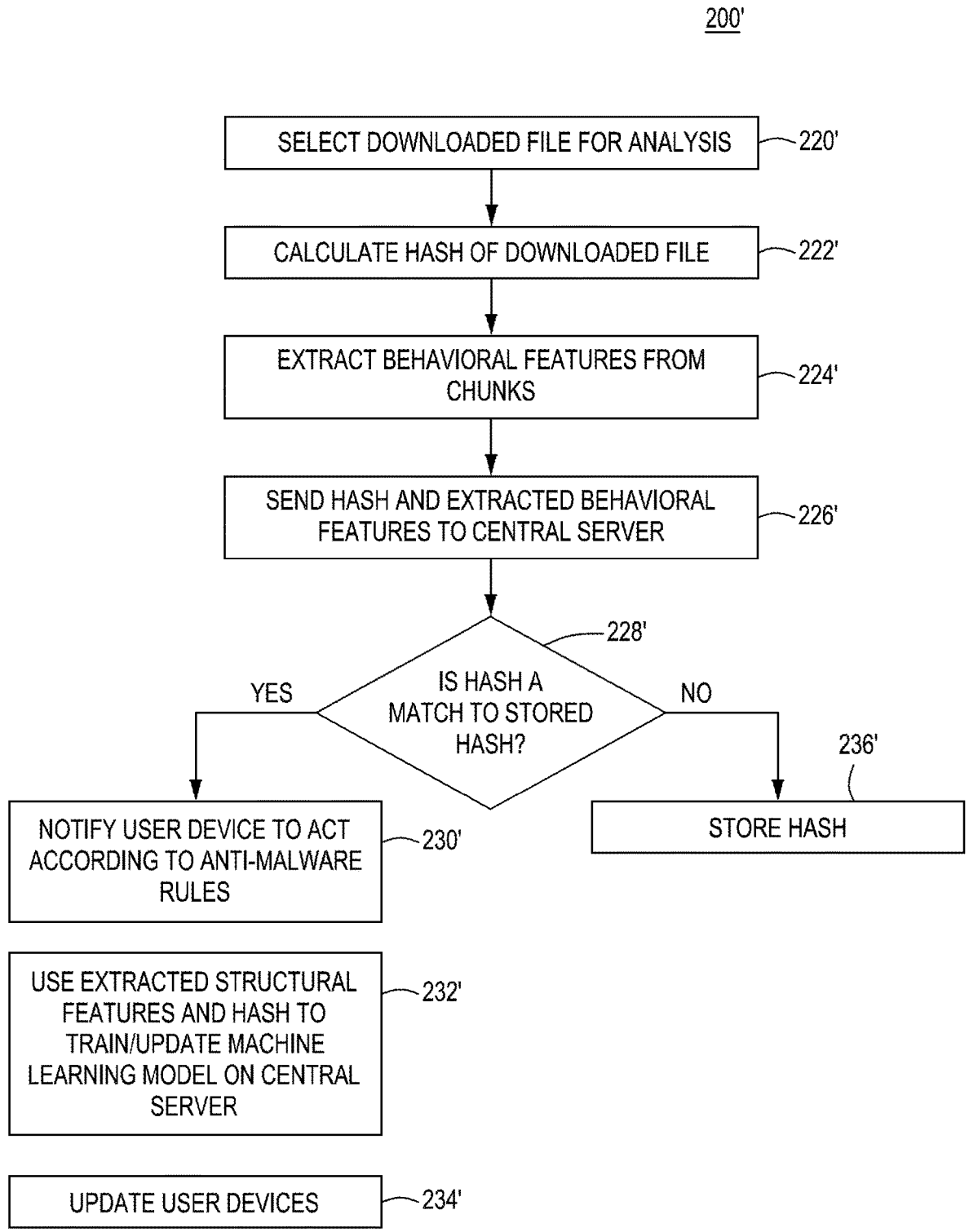

FIGS. 4A and 4B illustrate an alternate embodiment of the method 200 described above. In the method 200' shown in FIGS. 4A and 4B, steps 202'-216' are the same as steps 202-216 of method 200 and will not be discussed again for the sake of brevity. At step 220' the downloaded file is selected for further analysis. At step 222' a hash of the downloaded file is calculated. At step 224' behavioral features 115 are extracted from the chunks 129. At step 226' the hash and the behavioral features are sent to the central server for analysis. It will be appreciated that in some embodiments, steps 220'-226' may occur earlier in method 200', such as after step 206'. At step 228' a determination is made whether the calculated hash matches a stored hash of a known malicious file. If the calculated hash matches a stored hash (YES at step 228') then the user device 102 should receive a notification at step 230' for acting according to the various anti-malware-related rules, e.g., allow the execution of the file, block the execution of the file, report the file as malicious, allow the execution of the file only upon user authorization, etc. At step 232', the behavioral analysis module 150 of the central server 104 uses its machine learning module 152 to determine whether the downloaded file is malicious based on the behavioral features 115 and the hash sent to the central server 104. At step 234', the determination of the machine learning module 152 is used to update the machine learning algorithm used by the machine learning module 122 of the file verification module 124 on the user device 102 at step 234'. Also, if the calculated hash does not match a stored hash on the central server 104 (NO at step 228'), the hash 121 is stored at step 236'. For example, as the hashes 156 are updated over time, the hashes 121 stored at step 236' may be continually compared to the hashes 156, until a match with a hash 156 occurs, at which point the hash 121 and the structural features of the file associated with hash 121 can be used to train and update the machine learning model on the central server 104.

FIG. 5 depicts a computer system 500 that can be utilized in various embodiments of the invention to implement the computer and/or the display, according to one or more embodiments.

Various embodiments of method and system for blurring connection information in virtual private networks, as described herein, may be executed on one or more computer systems, which may interact with various other devices. One such computer system is computer system 500 illustrated by FIG. 5, which may in various embodiments implement any of the elements or functionality illustrated in FIGS. 1-4. In various embodiments, computer system 500 may be configured to implement methods described above. The computer system 500 may be used to implement any other system, device, element, functionality, or method of the above-described embodiments. In the illustrated embodiments, computer system 500 may be configured to implement the methods 200, 300, and 200' as processor-executable executable program instructions 522 (e.g., program instructions executable by processor(s) 510) in various embodiments.

In the illustrated embodiment, computer system 500 includes one or more processors 510*a*-510*n* coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In various embodiments, any of the components may be utilized by the system to receive user input described above. In various embodiments, a user interface may be generated and displayed on display 580. In some cases, it is contemplated that embodiments may be implemented using a single instance of computer system 540, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs). In multiprocessor systems, each of processors 510 may commonly, but not necessarily, implement the same ISA.

System memory 520 may be configured to store program instructions 522 and/or data 532 accessible by processor 510. In various embodiments, system memory 520 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 590), such as one or more external systems or between nodes of computer system 500. In various embodiments, network 590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via digital fiber communications networks; via storage area networks such as Fiber Channel SANs, or via any other suitable type of network and/or protocol.

Input/output devices 550 may, in some embodiments, include one or more display terminals, keyboards, keypads, touchpads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the operations and methods described above, such as the methods illustrated by the flowcharts of FIGS. 2A-4. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion and are not intended to imply that any specific implementation details are required. For example, any of the described modules and/or data structures may be combined or divided into sub-modules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

Example Clauses

A. A system for malware detection, the system having one or more processors configured to:
    perform, on a plurality of user devices, at least one of a static analysis or a behavioral analysis of a file downloaded to a user device;
    receive a plurality of features extracted from the downloaded file;

train at least one machine learning model, on a central server in communication with the plurality of user device, based on the plurality of features;

distribute the at least one trained machine learning model to the plurality of user devices; and update at least one of a machine learning model used for the static analysis or behavioral analysis with the distributed at least one trained machine learning model.

B. The system according to clause A, wherein in the performance of the at least one of a static analysis or a behavioral analysis, the one or more processors is configured to break the downloaded file into a plurality of chunks;

and extract at least one of structural or behavior features from the plurality of chunks.

C. The system according to clause A or B, wherein the structural features include at least one of a number of occurrences of each chunk in the downloaded file or information in a header of the downloaded file, and wherein behavioral features include at least one of a kernel API call, a call requesting other files, or a request for access to network connection or communication port of the user device.

D. The system according to clauses A-C, wherein the plurality of features include structural features and wherein the one or more processors are configured to calculate a hash of the downloaded file and train the at least one machine learning model based on the hash and the structural features.

E. The system according to clauses A-D, wherein the one or more processors is configured to receive at least one label of maliciousness of the downloaded file based on the performance of the at least one of a static analysis or a behavioral analysis and is configured to train at least one machine learning model based on the at least one label.

F. The system according to clauses A-E, wherein the one or more processors is configured to perform, on the central server, a behavioral analysis of the downloaded file based on behavioral features extracted from the downloaded file as a result of performance of the behavioral analysis performed on the plurality of user devices.

G. A method for malware detection, the method comprising:

performing, on a plurality of user devices, at least one of a static analysis or a behavioral analysis of a file downloaded to a user device;

receiving a plurality of features extracted from the downloaded file;

training at least one machine learning model, on a central server in communication with the plurality of user device, based on the plurality of features;

distributing the at least one trained machine learning model to the plurality of user devices; and updating at least one of a machine learning model used for the static analysis or behavioral analysis with the distributed at least one trained machine learning model.

H. The method according to clause G, wherein performing the at least one of a static analysis or a behavioral analysis includes:

breaking the downloaded file into a plurality of chunks; and extracting at least one of structural or behavior features from the plurality of chunks.

I. The method according to clauses G or H, wherein the structural features include at least one of a number of occurrences of each chunk in the downloaded file or information in a header of the downloaded file, and wherein behavioral features include at least one of a kernel API call, a call requesting other files, or a request for access to network connection or communication port of the user device.

J. The method according to clauses G-I, wherein the behavioral features include behaviors observed during execution of the downloaded file.

K. The method according to clauses G-J, further comprising calculating a hash of the downloaded file, wherein the plurality of features include structural features and training the at least one machine learning model is based on the hash and the structural features.

L. The method according to clauses G-K, further comprising receiving at least one label of maliciousness of the downloaded file based on the performance of the at least one of a static analysis or a behavioral analysis and is configured to train at least one machine learning model based on the at least one label.

M. The method according to clauses G-L, further comprising performing, on the central server, a behavioral analysis of the downloaded file based on behavioral features extracted from the downloaded file as a result of performing of the behavioral analysis performed on the plurality of user devices.

N. A non-transitory computer-readable medium storing a computer program, which, when read and executed by a computer causes the computer to perform a malware detection method comprising:

performing, on a plurality of user devices, at least one of a static analysis or a behavioral analysis of a file downloaded to a user device;

receiving a plurality of features extracted from the downloaded file;

training at least one machine learning model, on a central server in communication with the plurality of user device, based on the plurality of features;

distributing the at least one trained machine learning model to the plurality of user devices; and updating at least one of a machine learning model used for the static analysis or behavioral analysis with the distributed at least one trained machine learning model.

O. The non-transitory computer-readable medium according to clause N, wherein performing the at least one of a static analysis or a behavioral analysis includes:

breaking the binary code into a plurality of chunks; and extracting at least one of structural or behavior features.

P. The non-transitory computer-readable medium according to clauses N or O, wherein the structural features include at least one of a number of occurrences of each chunk in the downloaded file or information in a header of the downloaded file and wherein behavioral features include at least one of a kernel API call, a call requesting other files, or a request for access to network connection or communication port of the user device.

Q. The non-transitory computer-readable medium according to clauses N-P, wherein the behavioral features include behaviors observed during execution of the downloaded file.

R. The non-transitory computer-readable medium according to clauses N-Q, wherein the method further comprises calculating a hash of the downloaded file, wherein the plurality of features include structural features and training the at least one machine learning model is based on the hash and the structural features.

S. The non-transitory computer-readable medium according to clauses N-R, further comprising receiving at least one label of maliciousness of the downloaded file based on the performance of the at least one of a static analysis or a behavioral analysis and is configured to train at least one machine learning model based on the at least one label.

T. The non-transitory computer-readable medium according to clauses N-S, further comprising performing, on the central server, a behavioral analysis of the downloaded file based on behavioral features extracted from the downloaded file as a result of performing of the behavioral analysis performed on the plurality of user devices.

What is claimed is:

1. A system for malware detection, the system having one or more processors and memory configured to:
   perform, on a plurality of user devices, a behavioral analysis of an executable file downloaded to a user device, wherein performance of the behavioral analysis includes: breaking the executable file into a plurality of chunks; and extracting at least one behavioral feature from the plurality of chunks;
   classify the chunks based on the behaviors;
   score the chunks based on the behaviors;
   determine at least one label of maliciousness of the executable file based on the scores of the chunks;
   receive the at least one label of maliciousness of the executable file based on the performance of the behavioral analysis;
   receive a plurality of features extracted from the executable file;
   train at least one machine learning model, on a central server in communication with the plurality of user device, based on the plurality of features and the at least one label of maliciousness;
   distribute the at least one trained machine learning model to the plurality of user devices; and
   update a machine learning model used for the behavioral analysis with the distributed at least one trained machine learning model.

2. The system according to claim 1, wherein the behavioral features include at least one of a kernel API call, a call requesting other files, or a request for access to network connection or communication port of the user device.

3. The system according to claim 1, wherein the behavioral analysis includes execution of the executable file in a virtual machine or protected sandbox and correlation of behaviors occurring during execution with chunks.

4. The system according to claim 1, wherein the one or more processors is configured to perform, on the central server, a behavioral analysis of the executable file based on behavioral features extracted from the executable file as a result of performing of the behavioral analysis performed on the plurality of user devices.

5. A method for malware detection, the method comprising:
   performing, on a plurality of user devices, a behavioral analysis of an executable file downloaded to a user device, wherein performance of the behavioral analysis includes: breaking the executable file into a plurality of chunks; and extracting at least one behavioral feature from the plurality of chunks;
   classify the chunks based on the behaviors;
   score the chunks based on the behaviors;
   determine at least one label of maliciousness of the executable file based on the scores of the chunks;
   receiving the at least one label of maliciousness of the executable file based on the performance of the behavioral analysis;
   receiving a plurality of features extracted from the executable file;
   training at least one machine learning model, on a central server in communication with the plurality of user device, based on the plurality of features and the at least one label of maliciousness;
   distributing the at least one trained machine learning model to the plurality of user devices; and
   updating a machine learning model used for the behavioral analysis with the distributed at least one trained machine learning model.

6. The method according to claim 5, wherein behavioral features include at least one of a kernel API call, a call requesting other files, or a request for access to network connection or communication port of the user device.

7. The method according to claim 5, wherein the behavioral features include behaviors observed during execution of the executable file.

8. The method according to claim 5, wherein performing the behavioral analysis includes executing the executable file in a virtual machine or protected sandbox and correlating behaviors occurring during execution with the chunks.

9. The method according to claim 5, further comprising performing, on the central server, a behavioral analysis of the executable file based on behavioral features extracted from the downloaded file as a result of performing of the behavioral analysis performed on the plurality of user devices.

10. A non-transitory computer-readable medium storing a computer program, which, when read and executed by a computer causes the computer to perform a malware detection method comprising:
    performing, on a plurality of user devices, a behavioral analysis of an executable file downloaded to a user device, wherein performance of the behavioral analysis includes: breaking the executable file into a plurality of chunks; and extracting at least one behavioral feature from the plurality of chunks;
    classify the chunks based on the behaviors;
    score the chunks based on the behaviors;
    determine at least one label of maliciousness of the executable file based on the scores of the chunks;
    receiving the at least one label of maliciousness of the executable file based on the performance of the behavioral analysis;
    receiving a plurality of features extracted from the executable file;
    training at least one machine learning model, on a central server in communication with the plurality of user device, based on the plurality of features and the at least one label of maliciousness;
    distributing the at least one trained machine learning model to the plurality of user devices; and
    updating a machine learning model used for the behavioral analysis with the distributed at least one trained machine learning model.

11. The non-transitory computer-readable medium according to claim 10, wherein the at least one behavioral features include at least one of a kernel API call, a call requesting other files, or a request for access to network connection or communication port of the user device.

12. The non-transitory computer-readable medium according to claim 10, wherein performing the behavioral analysis includes executing the executable file in a virtual machine or protected sandbox and correlating behaviors occurring during execution with the chunks.

13. The non-transitory computer-readable medium according to claim 10, wherein the method further comprises receiving at least one label of maliciousness of the executable file based on the performance of the behavioral analysis and is configured to train at least one machine learning model based on the at least one label.

14. The non-transitory computer-readable medium according to claim 10, wherein the method further comprises performing, on the central server, a behavioral analysis of the executable file based on behavioral features extracted from the downloaded file as a result of performing of the behavioral analysis performed on the plurality of user devices.

\* \* \* \* \*